United States Patent Office 2,776,902
Patented Jan. 8, 1957

2,776,902

HYDRAULIC CEMENT COMPOSITIONS CONTAINING AIR DETRAINING AGENTS AND METHODS OF USING SAME

Edward W. Scripture, Jr., St. James, Barbados, British West Indies, assignor, by mesne assignments, to American-Marietta Company, Chicago, Ill., a corporation of Illinois No Drawing. Original application September 8, 1953, Serial No. 379,094. Divided and this application August 18, 1954, Serial No. 450,818

4 Claims. (Cl. 106—90)

This invention relates to hydraulic cement concrete or mortar mixes, methods of preparing the same, and compositions for addition thereto. It especially relates to such mixes and additive compositions containing an agent for reducing the amount of air entrained in the final mixes.

One of the objectives of the cement industry for many years has been to develop concrete which would have greater resistance to the destructive effects of freezing and thawing when exposed to the weather, and especially to the extremely destructive effects on pavements when salts, such as calcium chloride and sodium chloride, are used for de-icing. It has been found in recent years that a very marked increase in the resistance of concrete to freezing and thawing and in its resistance to scaling when de-iced with calcium chloride and the like, can be produced by increasing the normal entrainment of air in the concrete mix. This air is believed to be entrained in the concrete in the form of small, discrete spheroids, and it is thought that these small discrete spheroids, being totally enclosed within the cement matrix, do not completely fill with water when the concrete is wet and so provide a cushion to minimize the effects of the disruptive forces of freezing and thawing. Also, an increase in the amount of entrained air tends to reduce the tendency of the concrete toward bleeding. By reducing the bleeding, the formation of laitance on the surface of the concrete, which is one of the causes of scaling, is more or less prevented.

A small quantity of air is always entrained in concrete, the amount usually being between 0.5% and 2%, but additional air can be entrained in a number of different ways and by various air entraining agents. Certain materials which markedly lower the surface tension of water, i. e., foaming agents, will promote the entrainment of air in concrete. Among these which have been used are the petroleum hydrocarbon insoluble fraction of a coal tar hydrocarbon extract of pinewood, and tall oil or talloel, derived from the waste liquor from the sulphate process of paper manufacture. Another group of compounds which may be used to accomplish this purpose is that composed of alkali salts of fatty alcohol sulphates, such as sodium lauryl sulphate. Still another group is composed of the alkali salts of alkyl phenyl sulphonates. It has also been found that the dispersion of the cement with calcium lignosulphonate derived from waste sulphite liquor will cause the entrainment of some air in concrete and will improve resistance to freezing and thawing. The reagents commonly used for air entrainment are generally employed in very small percentages, usually from about .002% to .30% of the weight of the cement, depending on the particular reagent involved. However, in some cases, either more or less than these amounts may be used, depending upon the effect desired, upon the general composition of the mix, upon the particular air entraining agent employed, and upon certain other variables affecting the mix.

The entrainment of additional air in a concrete or mortar mix may be accomplished by the use of an air entraining agent in the form of a liquid or a paste or a dry powder, whichever is more convenient and economical in a particular situation. The air entraining agent may be added to the cement at any time or ground with the cement at the time of manufacture of the cement. Cements which have been ground with a suitable proportion of air entraining agent are known as "air entraining cements," and such cements are the subject of ASTM specification C–175–47T. The air entraining agent, alone or combined with other ingredients, may be added to the cement, to the aggregate, to the water, or to any other part of the mix prior to mixing or during mixing, or it may be added to the entire mix at any time prior to completion of the mixing.

In the practice of air entrainment to improve the resistance of concrete to freezing and thawing, it is usually desirable to produce an air content in the concrete somewhere between about 3% and 6% by volume of the concrete. If the air content of the concrete is not as high as 3% by volume, the full benefits of air entrainment are not realized. On the other hand, if the air content of the concrete rises above about 5% or 6% by volume, serious losses in strength are produced without any further increase in durability. One of the drawbacks to the use of air entraining agents in concrete is that it tends to reduce the compressive and flexural strengths of the concrete, even though the air content is maintained below 5% or 6% by volume.

Since the amount of air entrained in concrete by employing a given amount of a particular air entraining agent may vary widely with different conditions, such as the cement factor, type of aggregates, size-grading of the aggregates, slump, temperature, time of mixing, type of mixing, and many others, it is difficult to control the amount of air entrained in a mix and keep it within the desired limits. This is especially true when using the so-called air entraining cements. Since the entrainment of air in concrete, even though not in an excessive amount, tends to lower the compressive and flexural strengths, it is sometimes desirable to reduce the amount of entrained air where strength is of paramount importance, particularly if resistance to freezing and thawing is not a factor, as in the case of interior floor slabs. In some cases, it may even be desirable to decrease the amount of air that would normally be entrained when no air entraining agent is used.

It is an object of this invention to provide a method, and class of compositions to be employed therewith, for reducing or preventing the entrainment of air in hydraulic cement, concrete or mortar mixes, whether resulting from the inherent air entraining characteristics of the mixes or from the addition of air entraining agents thereto.

It is a further object of this invention to provide hydraulic cement, concrete, or mortar mixes of improved structural strength containing additives for controlling or reducing the amount of air entrained therein by either an air entraining agent interground with the cement, or one added at the mixer, or by the inherent air entraining characteristics of mixes.

It is a further object of this invention to provide a method for controlling the entrainment of air in hydraulic cement, concrete, or mortar mixes within any desired limits by the incorporation therein of novel compositions which reduce or prevent the entrainment of air in the mixes. Other objects and advantages of the invention will become apparent as the description proceeds.

Though the exact mechanism by which the compounds utilized in accordance with the present invention function to control the amount of air in concrete or mortar mixes is somewhat obscure, it appears that they actually function in many instances to remove entrained air from the mixes, and not merely to prevent air from being entrained by special air entraining components of the mixes or by the inherent air entraining characteristics of ordinary mixes. For this reason they may appropriately be called "air de-entraining agents," or, to coin a somewhat simpler term, "air detraining agents." The latter term is employed hereinafter to designate such compounds.

In the foregoing paragraphs, reference is made to "hydraulic cement concrete or mortar mixes." The distinction, if any, between "concrete" and "mortar" in the broad sense of those terms, where hydraulic cement is indicated as the principal binding agent, resides primarily in the size range of the particles of the aggregate or filler. For convenience and simplicity, such compositions are hereinafter merely referred to as "hydraulic cement mixes." It is to be understood that, throughout this specification and the appended claims, this last expression is intended to include both concrete mixes and mortar mixes in which hydraulic cement is the principal binding agent.

The compounds which I have found to be effective are liquids at or near normal temperatures, are substantially insoluble or immiscible in water, and contain both a lyophyllic group or groups (such, for example, as a phosphate, carbonate, phthalate, oxalate, lactate, hydroxyl, or amine group) and a substituted or unsubstituted hydrocarbon lyophobic group or groups. However, as hereinafter more fully explained, not all compounds having these properties will function as air detraining agents. We have found that the air detraining agents are effective, in very small quantities, to decrease or prevent the entrainment of air in hydraulic cement mixes, or to remove air therefrom, and thereby increase the structural strength of the mixes when set. This increase in strength is manifested at all ages from the early age of one day to the ultimate strength at 28 days, and thereafter.

It is common practice to incorporate a cement dispersing agent in hydraulic cement mixes for reducing the water required to obtain a given degree of plasticity in the mixes. Of the various agents capable of being used for this purpose, calcium ligno sulfonate and waste sulfite liquor, of which calcium ligno sulfonate is the principal constituent, are the most widely used. These materials, however, also act as air entraining agents, and their use has often been attended by excessive air entrainment.

We have further found that when a hydraulic cement mix containing one of these cement dispersing agents also has an air detraining agent added thereto, the desired effects of the dispersing agent can be obtained without causing the entrainment of an excessive amount of air. It is thus possible to obtain the benefits of good cement dispersion without the disadvantages formerly inherent in the use of dispersing agents for that purpose.

It is sometimes desired to increase the rate of hardening of the hydraulic cement mix, and an accelerator may be used for this purpose. Calcium chloride is a readily available and inexpensive accelerating agent, but there are numerous others well known in the art. The desirable proportions of accelerator are usually between .1% and 2% or 2.5% by weight of the cement. Additional ingredients, such as fly ash and other finely divided materials, may be present in the accelerating composition or in the hydraulic cement mix to improve workability or provide pozzuolanic action. If it is desired further to increase the ultimate strength of a hydraulic cement mix, it may be desirable also to incorporate a derivative of benzoic acid, such as those disclosed in U. S. Patent No. 2,264,336. The preferred derivative of benzoic acid is salicylic acid, or a salt thereof. The air detraining agents of this invention may advantageously be premixed with any or all of the foregoing additives in order that the effects of a desired combination thereof may be obtained without the inconvenience of adding them separately at the time the final hydraulic cement mix is prepared.

As little of the air detraining agent as .0005%, based on the weight of the cement, is noticeably effective in decreasing the air content of a hydraulic cement mix and improving the properties of products produced therefrom. An amount of such compounds greatly in excess of .05% will generally decrease the air content to an insignificant quantity, and a greater amount is therefore seldom required. The amount of air detraining agent which should be used is dependent to some extent on the particular agent employed, but the preferred range is from about .001% to about .01%, based on the weight of the cement. With some cements and some mixes it may be desirable to use even smaller amounts than .001%, and, upon occasion, the use of large quantities, such as .1% or so, will be found to be advantageous.

A preferred class of air detraining agents comprises the higher aliphatic alcohols, i. e. aliphatic alcohols of relatively high molecular weight, which are substantially insoluble or immiscible in water. Among the suitable higher aliphatic alcohols are both the saturated and unsaturated compounds represented by the generic formula $C_xH_yCH_2OH$, where $x$ is from six to seventeen inclusive and $y$ is from fifteen to thirty-five inclusive. The alkyl radical may be either a straight chain hydrocarbon or a branch chain hydrocarbon. Such higher alcohols, which are relatively insoluble in water, are preferably those which are liquid at the temperature of the concrete mix before placement. These temperatures generally range from just above freezing to a temperature of 100° to 120° F., although under some conditions the temperature may be higher. Where the term "liquid" is used herein in describing the air detraining agent without reference to any particular temperature, the temperature of the mix in which the agent is incorporated is to be understood by implication.

Another class of compounds which are highly effective air detraining agents may be defined as esters of weak inorganic acids, such as organic phosphates, borates, and carbonates. The organic radical or radicals in such compounds may be either aliphatic or aromatic. Specific examples of compounds falling in this general class of esters of weak inorganic acids are:

Tributyl phosphate
Tri-2 ethyl hexyl phosphate
Trichloroethyl phosphate
Tricresyl phosphate
n-Butyl carbonate
n-Butyl borate
n-Amyl borate Another compound which falls in none of the above classes, but which has been found to be very effective as an air detraining agent, is dibutyl phthalate (ester of a weak aromatic acid). However, no other esters of aromatic acids have yet been found which will function as air detraining agents.

While I originally believed that the broad class of air detraining agents could be generically defined as compounds which are substantially water-insoluble or water-immiscible, are liquids at the hydraulic cement mix temperature, and have both a lyophillic group and a hydrocarbon hyophobic group (the latter including non-hydrocarbon substituents such as chloro, hydroxy, etc.), I have since found that there are exceptions to such a generic definition. Thus, for example, certain water-insoluble, liquid esters of weak aromatic acids, such as dimethyl phthalate and methyl salicylate, fall within the terms of such definition but are ineffective as air detraining agents, whereas dibutyl phthalate, a closely related compound responding to the same generic definition, is highly effective as an air detraining agent.

The decrease in the entrained air content and greatly improved structural strength accompanied by improvements in other properties, such as reduction of the water required for a given consistency, securable by the use of air detraining agents in accordance with this invention, will be seen from the following examples. In all of the examples, except where otherwise indicated, the percentages of air entrained in the mixes tested are given as percent by volume and were determined by means of the Klein-Walker Air Meter. Amounts of other components given in terms of percent are amounts by weight based on the weight of the hydraulic cement.

Example 1

Concrete mixes were made with an air entraining cement, both with and without addition of 2 ethyl hexyl alcohol (octyl alcohol) as an air detraining agent. Mix No. 1, the control mix, was made with 6 sacks of cement per cu. yd. of concrete with no addition. Mix No. 2 was made with the same cement factor and the addition of .0075% 2-ethyl hexyl alcohol. Both the mixes were made to slumps of approximately 3½ to 4 inches, and cylinders were made and tested for compressive strength, in accordance with standard procedures. The results secured on these mixes are given in the following tabulation:

| Mix No. | Water-Cement Ratio, Gals./Sack | Air, Percent | Compressive Strength, Lbs./Sq. In. | | |
|---|---|---|---|---|---|
| | | | 1 Day | 7 Days | 28 Days |
| 1 | 5.18 | 4.8 | 650 | 3,010 | 4,140 |
| 2 | 5.21 | 3.4 | 690 | 3,500 | 4,840 |

It will be seen that the addition of 2-ethyl hexyl alcohol reduced the amount of entrained air from 4.8 to 3.4% without materially affecting the amount of water required, and substantially increased the compressive strengths at all ages.

Example 2

Three mixes were made up with an air entraining cement, one without any addition, another with the addition of calcium lignosulphonate combined with calcium chloride, and a third with calcium lignosulphonate and calcium chloride combined with 2-ethyl hexyl alcohol. Mix No. 1, the control mix, was made with 6 sacks of cement per cubic yard of concrete with no addition. Mix No. 2 was made with the same cement factor and the addition of 0.25% calcium lignosulphonate and 0.25% calcium chloride. Mix No. 3 was made with 0.25% calcium lignosulphonate and 0.25% calcium chloride combined with .0075% 2-ethyl hexyl alcohol. The three mixes were made to slumps of approximately 3½ to 4 inches, and cylinders were made and tested for compressive strength in accordance with standard procedure. The results of these mixes are given in the following tabulation:

| Mix No. | Water-Cement Ratio, Gals./Sack | Air, Percent | Compressive Strength, Lbs./Sq. In. | | |
|---|---|---|---|---|---|
| | | | 1 Day | 7 Days | 28 Days |
| 1 | 5.18 | 4.8 | 650 | 3,010 | 4,140 |
| 2 | 4.67 | 8.7 | 650 | 2,780 | 3,840 |
| 3 | 4.77 | 4.2 | 880 | 4,070 | 5,020 |

It will be seen that in Mix No. 2 the addition of the dispersing agent calcium lignosulphonate caused the entrainment of an excessive amount of air, thereby reducing the strength and structural value of the concrete, in spite of the fact that it also reduced the water-cement ratio. In Mix No. 3, however, the addition of the 2-ethyl hexyl alcohol together with the cement dispersing agent prevented the entrainment of an excessive percentage of air, thereby materially enhancing the structural value or strength of the concrete while retaining the advantages with respect to the durability of the concrete inherent in the entrainment of a moderate amount of air.

Example 3

Concrete mixes were made with an air entraining cement, both with and without addition of n-octanol as an air detraining agent. Mix No. 1, the control mix, was made with 6 sacks of cement per cu. yd. of concrete with no addition. Mix No. 2 was made with the same cement factor and the addition of .0013% n-octanol. Both the mixes were made to slumps of approximately 3½ to 4 inches, and cylinders were made and tested for compressive strength in accordance with standard procedures. The results secured with these mixes are given in the following tabulation:

| Mix No. | Water-Cement Ratio, Gals./Sack | Air, Percent | Compressive Strength, Lbs./Sq. In. | | |
|---|---|---|---|---|---|
| | | | 1 Day | 7 Days | 28 Days |
| 1 | 5.31 | 5.3 | 620 | 2,370 | 3,440 |
| 2 | 5.36 | 4.2 | 740 | 3,010 | 3,840 |

It will be seen that the addition of n-octanol reduced the amount of entrained air from 5.3% to 4.2% without materially affecting the amount of water required, and substantially increased the compressive strengths at all ages.

Example 4

Three mixes were made up with an air entraining cement, one without any addition, another with the addition of calcium lignosulphonate combined with calcium chloride, and a third with calcium lignosulphonate and calcium chloride combined with n-decanol as an air detraining agent. Mix No. 1, the control mix, was made with 6 sacks of cement per cubic yard of concrete with no addition. Mix No. 2 was made with the same cement factor and the addition of 0.25% calcium lignosulphonate and 0.25% calcium chloride. Mix No. 3 was made with 0.25% calcium lignosulphonate and 0.25% calcium chloride combined with .0013% n-decanol. The three mixes were made to slumps of approximately 3½ to 4 inches, and cylinders were made and tested for compressive strength in accordance with standard procedures. The results on these mixes are given in the following tabulation:

| Mix No. | Water-Cement Ratio, Gals./Sack | Air, Percent | Compressive Strength, Lbs./Sq. In. | | |
|---|---|---|---|---|---|
| | | | 1 Day | 7 Days | 28 Days |
| 1 | 5.12 | 5.1 | 730 | 2,890 | 3,800 |
| 2 | 4.62 | 7.9 | 870 | 2,420 | 4,280 |
| 3 | 4.78 | 5.1 | 1,200 | 3,800 | 5,080 |

It will be seen that in Mix No. 2 the addition of the dispersing agent, calcium lignosulphonate, caused the entrainment of an excessive amount of air, thereby reducing the strength and structural value of the concrete, in spite of the fact that it also reduced the water-cement ratio. In Mix No. 3, however, the addition of the n-decanol together with the cement dispersing agent prevented the entrainment of an excessive percentage of air, thereby materially enhancing the structural value or strength of the concrete while retaining the advantages with respect to the durability of the concrete inherent in the entrainment of a moderate amount of air.

Example 5

Two concrete mixes were made with air entraining cement, both with and without the addition of tributyl phosphate. Mix No. 1 was made with 6 sacks of cement per cu. yd. of concrete with no addition. Mix No. 2 was made with the same cement factor and the addition of .001% tributyl phosphate as an air detraining agent. Both mixes were made to slumps of 3½ to 4 inches, and cylinders were made and tested for compressive strength in accordance with standard procedures. The results secured with these mixes are given in the following tabulation:

| Mix No. | Water-Cement Ratio, Gals./Sack | Air, Percent | Compressive Strength, Lbs./Sq. In. | | |
|---|---|---|---|---|---|
| | | | 1 Day | 7 Days | 28 Days |
| 1 | 5.30 | 5.7 | 800 | 2,650 | 3,700 |
| 2 | 5.64 | 4.0 | 920 | 3,700 | 4,720 |

Example 6

Tests were made in accordance with ASTM method, designation C 185–47T, in which the air content was determined on a mortar made with an air entraining cement without any air detraining agent and on a corresponding mortar made with the same air entraining cement and 0.5% of tricresyl phosphate as an air detraining agent.

The ASTM method of test C 185–47T consists in making a mortar in the proportions of 300 gr. of cement to 1200 gr. of standard Ottawa sand graded to pass a #20 sieve and be retained on a #30 sieve. The mortar is mixed, adding water until a flow between 2.4" and 2.9" on the Burmister mortar flow trough is secured. After the flow has been measured, the weight of 500 ml. of mortar is determined by placing the mortar in a container, leveling it off at the top, and weighing it on a balance. The air content of the mortar is calculated in accordance with the formula:

$$\text{Air content, percent by volume} = 100 - 2W\left(\frac{182.7+P}{5000+10P}\right)$$

where:

$W$ = weight of 500 ml. of mortar in grams, and
$p$ = percentage mixing water, based on weight of cement used.

The air entrained in the mortar containing no air detraining agent was 16.5%, whereas the entrained air in the mortar containing the tricresyl phosphate was only 7.0%, or a reduction of 57.5%.

Example 7

Tests were made as in Example 6 using an air entraining cement with no air detraining agent and on a corresponding mortar made with the same cement and .05% of tri-2 ethyl hexyl phosphate as an air detraining agent.

The air entrained in the mortar containing no air detraining agent was 16.5%, whereas the entrained air in the mortar containing the air detraining agent was only 8.5%, or a reduction of 48.5%.

Example 8

Tests were made as in Example 6 using an air entraining cement with no air detraining agent and on a corresponding mortar made with the same cement and .05% of n-butyl carbonate as an air detraining agent.

The air entrained in the mortar containing no air detraining agent was 14.5%, whereas the entrained air in the mortar containing the air detraining agent was only 8.3%, or a reduction of 42.8%.

Example 9

Tests were made as in Example 6 using an air entraining cement with no air detraining agent and on a corresponding mortar made with the same cement and .05% of dibutyl phthalate as an air detraining agent.

The air entrained in the mortar containing no air detraining agent was 16.5%, whereas the entrained air in the mortar containing the air detraining agent was only 8%, or a reduction of 51.5%.

Example 10

Tests were made as in Example 6 using an air entraining cement with no air detraining agent and on a corresponding mortar made with the same cement and .05% of a mixture of unsaturated fatty alcohols having 16 and 18 carbon atoms as an air detraining agent.

The air entrained in the mortar containing no air detraining agent was 16.5%, whereas the entrained air in the mortar containing the air detraining agent was only 6.5%, or a reduction of 60.7%.

In the foregoing examples, the air detraining agents were added in their normally liquid form to the mixes along with the other ingredients during mixing. However, many variations of this procedure may be practiced while obtaining the same effective results from the air detraining agents. Thus, for example, a substantially inert, solid, finely divided material, such as precipitator dust, fly ash, talc, or the like, or a finely divided pozzuolanic material, such as bauxite residue, pumice, diatomaceous earths, etc., may be employed as a diluent for the air detraining agent, and also for a cement dispersing agent, such as calcium ligno sulfonate and a hardening accelerator such as calcium chloride. Such diluted mixtures may be formed by mixing thoroughly together a quantity of the air detraining agent, the other additives desired, if any, and a sufficient quantity of one of the above mentioned finely divided filling materials to produce a mixture having either a smooth, pasty consistency or the consistency of a dry powder. The invention is principally of value for use at the time of preparing hydraulic cement mixes for modifying previously prepared hydraulic cements having excessive air entraining characteristics for the particular job in which the mixes are to be used, or for counteracting undesired air entraining characteristics of other additives, such as cement dispersing agents. Accordingly, in practice, the air detraining agents will normally be incorporated into a cement mix as an additive along with a previously prepared hydraulic cement at the time the final mix is prepared. Such additive, with or without a diluent, may be added directly to the mix or may be premixed with any of the other ingredients.

When the air detraining agent is to be premixed only with an inert diluent, it is obvious that the proportions of agent to diluent are in no way critical, the diluent being present primarily for the purpose of bringing the total volume of the additive mixture up to a quantity which can be accurately measured with the measuring tools customarily employed by the trade in proportioning the ingredients of a concrete or mortar mix.

When the air detraining agent is to be premixed with other active agents, such as a hardening agent and/or a dispersing agent, as well as with a suitable diluent, the proportions are critical only in the sense that selection and use of a given quantity of the final mixture necessarily determines the quantity of each active agent included in the mixture. Accordingly, it is merely necessary that the relative proportions of the active agents be balanced to achieve the several effects desired in a particular type of mix prepared to meet a particular set of performance standards. The proportions of the active ingredients in such a case will vary widely according to the particular active agents employed, the other ingredients of the mix, the performance standards to be met by the final product, etc.

To illustrate the wide latitude permissible in the handling of the air detraining agents, and not by way of limitation, the following examples are given of suitable mixtures adapted to be included with hydraulic cement, aggregate, and water in the preparation of concrete or mortar mixes.

Example 11

Tests were run, in accordance with the ASTM method described in Example 6, on a mortar made from an air entraining cement containing no special additives and on a corresponding mortar made with the same cement having 0.05% tributyl phosphate as an air detraining agent premixed therewith prior to incorporating the cement in the mortar.

The air entrained in the mortar containing no air detraining agent was 20.5%, whereas the entrained air in the mortar containing the air detraining agent was only 6.4%.

*Example 12*

Tests were run in the same manner on (1) a mortar made from an air entraining cement containing no special additives, (2) a corresponding mortar made from the same air entraining cement having 0.3% calcium ligno sulfonate mixed therewith prior to incorporating the cement in the mortar, and (3) a corresponding mortar made from the same cement having 0.3% calcium ligno sulfonate and 0.05% tributyl phosphate premixed therewith.

The amount of air entrained in the three mortars was as follows:

| | Percent |
|---|---|
| Mix No. (1) | 20.5 |
| Mix No. (2) | 33.7 |
| Mix No. (3) | 5.0 |

*Example 13*

Tests were run in the same manner on (1) a mortar mix made from an air entraining cement containing no special additives, (2) the same air entraining cement plus a paste of fly ash, water, and lauryl alcohol as an air detraining agent, and (3) the same air entraining cement plus a paste of finely ground slag, water, and a mixture of unsaturated fatty alcohols having 16 and 18 carbon atoms as an air detraining agent. In Mix Nos. (2) and (3), the paste consisted of 100 parts fly ash or ground slag and 50 parts water to 1 part of the alcoholic air detraining agent, by weight. The amount of the paste employed in each case was 3 parts to 40 parts of cement by weight to give concentrations of air detraining agent in the final mortars of 0.05% by weight based on the amount of the cement.

The amount of air entrained in the three mortars was as follows:

| | Percent |
|---|---|
| Mix (1) | 20.5 |
| Mix (2) | 8.7 |
| Mix (3) | 10.5 |

*Example 14*

Tests were made in the same manner on (1) a mortar mix made from an air entraining cement containing no special additives, (2) the same air entraining cement plus a mixture of fly ash and tri-2 ethyl hexyl phosphate added as an air detraining agent in the form of a dry powder, and (3) the same air entraining cement plus a mixture of finely ground silica and n-butyl carbonate added as an air detraining agent in the form of a dry powder. In Mix Nos. (2) and (3), the dry powder consisted of 100 parts of the fly ash or ground silica to 1 part of the phosphate or carbonate air detraining agent, by weight. The amount of the powder employed in each case was 1 part to 20 parts of cement by weight to give concentrations of air detraining agent in the final mortars of 0.05% by weight based on the amount of the cement.

The amount of air entrained in the three mortars was as follows:

| | Percent |
|---|---|
| Mix No. (1) | 20.9 |
| Mix No. (2) | 13.7 |
| Mix No. (3) | 14.5 |

In the foregoing discussion and examples, and in the claims, the term "inert" refers to finely divided solid materials which will not combine with lime to any appreciable extent.

The term "pozzuolanic material" refers to both natural and artificial, finely divided substances, other than hydraulic cements, which will take up lime from solution, either by chemical combination or absorption, to form a relatively insoluble combination which has some cementitious value.

The term "hydraulic cement" refers to materials which will react with water alone to form cementitious compounds.

The term "finely divided" refers to solid substances of which all or substantially all will pass through a 100 mesh sieve.

The term "diluent" refers to both solids and liquids, including water, with which the diluted substance may be thoroughly mixed or dispersed by solution or emulsification.

The term "water-insoluble" is broadly used with reference to immiscibility, as well as to insolubility. The term "substantially water-insoluble" is a relative term capable of indicating different degrees of insolubility according to the purposes to be accomplished. Though I have not been able to verify the fact with certainty, I believe the compounds that are operative as air detraining agents are sufficiently insoluble in water so that, in the amounts in which they are used, they remain at least partly undissolved in the water of the mix in which they are incorporated. All of the operative compounds with which I am familiar have a water-solubility of less than 1 gm. per 100 gms. of water at 20° C., and most of them less than 0.6 gms. per 100 gms. of water at 20° C. Accordingly, for greater definiteness in the appended claims, the term in question is used to indicate a maximum solubility in water of the order indicated.

The term "aggregate" is employed in its broad technical sense and includes sand as well as the coarser filling materials.

The term "consisting essentially of," as used in the appended claims, refers only to the ingredients that normally constitute the major portion of hydraulic cement concrete or mortar mixes used in the construction industry, i. e., hydraulic cement, aggregate (including sand), and water. The term is used to designate cement mixes in which these three ingredients are employed in substantially conventional proportions and constitute the essential structural part of the mix when set. The term is not used and should not be construed to preclude the presence of relatively small amounts of various additives, such as the several types mentioned above, for modifying the properties of the mixes to suit special needs in the construction industry.

It will be seen from the foregoing discussion and examples that a simple and highly effective remedy has been provided for the difficulty resulting from excessive air entrainment in hydraulic cement mixes. By means of this invention (a) greater advantage can be taken of such additives as calcium ligno sulfate, which have incidental air entrainment properties; (b) a given air entrainment cement can be employed under different conditions which would normally result in wide variations in the amount of air entrained, and the amount of entrained air can be controlled as desired; and (c) the air normally entrained by reason of the inherent air entraining characteristics of all concrete and mortar mixes can be reduced to negligible proportions where exposure conditions do not require any air as a protection against freezing and thawing.

It will also be apparent that a large number of compounds are suitable for use in varying concentrations as air detraining agents and that they may be incorporated into hydraulic cement mixes by many different procedures. Accordingly, the invention is not limited to the specific examples described by way of illustration, but is intended to cover all such variations as would occur to one skilled in the art, within the true spirit and scope of the appended claims.

This application is a division of my copending application Serial No. 379,094, filed September 8, 1953, for Hydraulic Cement Compositions Containing Air Detraining Agents and Methods of Using Same.

What I claim is:

1. A hydraulic cement mix of non-foaming ingredients consisting essentially of hydraulic cement, aggregate, and water sufficient for hydraulic setting of the cement and production of a workably plastic mix, and additionally containing up to a maximum of about 0.1%, by weight of the cement, of a substantially water-insoluble, liquid, aliphatic alcohol having from about seven to eighteen carbon atoms to reduce the amount of air entrained in the mix.

2. A hydraulic cement mix of non-foaming ingredients consisting essentially of hydraulic cement, aggregate, and water sufficient for hydraulic setting of the cement and production of a workably plastic mix, and additionally containing up to a maximum of about 0.05%, by weight of the cement, of a substantially water-insoluble, liquid, aliphatic alcohol having from about seven to eighteen carbon atoms to reduce the amount of air entrained in the mix.

3. The method of controlling the amount of air entrained in non-foaming cement mixes containing water sufficient for hydraulic setting of the cement, consisting essentially of incorporating into the mix up to a maximum of about 0.1%, by weight of the cement, of a substantially water-insoluble, liquid, aliphatic alcohol having from about seven to eighteen carbon atoms.

4. The method of controlling the amount of air entrained in non-foaming cement mixes containing water sufficient for hydraulic setting of the cement, consisting essentially of incorporating into the mix up to a maximum of about 0.05%, by weight of the cement, of a substantially water-insoluble, liquid, aliphatic alcohol having from about seven to eighteen carbon atoms.

References Cited in the file of this patent

UNITED STATES PATENTS

| | | |
|---|---|---|
| 2,141,570 | Mark | Dec. 27, 1938 |
| 2,238,540 | Sourwine | Apr. 15, 1941 |
| 2,313,107 | Wertz | Mar. 9, 1943 |

FOREIGN PATENTS

| | | |
|---|---|---|
| 703,338 | Germany | 1941 |